(12) United States Patent
Moser

(10) Patent No.: US 6,234,907 B1
(45) Date of Patent: May 22, 2001

(54) QUICK DISCONNECT DRIVESHAFT TRANSMISSION YOKE

(75) Inventor: Greg A. Moser, Portland, IN (US)

(73) Assignee: Greg Moser Engineering, Inc., Portland, IN (US)

( * ) Notice: Subject to any disclaimer, the term of this patent is extended or adjusted under 35 U.S.C. 154(b) by 0 days.

(21) Appl. No.: 09/338,953

(22) Filed: Jun. 24, 1999

(51) Int. Cl.$^7$ ........................................ F16D 3/18
(52) U.S. Cl. .................. 464/134; 464/159; 464/905; 403/359.1
(58) Field of Search ..................... 464/134, 901, 464/112, 147, 150, 154, 156, 157, 158, 159, 182, 185, 905; 403/359.1, 359.2, 359.5, 359.6, 344, 373, 374.1, 374.2, 374.3

(56) References Cited

U.S. PATENT DOCUMENTS

| | | | |
|---|---|---|---|
| 3,069,875 | * 12/1962 | Crum, Jr. ........................ | 464/157 |
| 3,551,013 | * 12/1970 | Trojanowski et al. ............ | 464/901 |
| 3,992,120 | * 11/1976 | Recker ............................ | 403/359 |
| 4,091,640 | * 5/1978 | Olkowski, Jr. et al. .......... | 464/901 |
| 4,169,686 | * 10/1979 | Balensiefen et al. ............ | 464/901 |
| 5,006,007 | * 4/1991 | Fischer et al. ................... | 403/359 |
| 5,069,054 | * 12/1991 | Hladky et al. ................... | 464/182 |
| 5,186,573 | * 2/1993 | Flotow ............................ | 464/169 |
| 5,647,683 | * 7/1997 | Easley ............................. | 464/182 |
| 5,674,024 | * 10/1997 | Castellon ........................ | 464/182 |

* cited by examiner

Primary Examiner—Lynne H. Browne
Assistant Examiner—Kenn Thompson

(57) ABSTRACT

Utilizing the quick disconnect driveshaft transmission yoke of the present invention, just a ½ turn of 4 lock nuts on a pair of split lock collars frees a splined slider from its fixed engagement with an external (male) splined output transmission shaft and allows the splined slider to slide rearward within yoke. The splined slider slides rearward within the yoke until the splined slider slides free of the external (male) splined output transmission shaft. The yoke, which has also been freed from the locking engagement of the split lock collars, then drops free and clear of the external (male) splined output transmission shaft. The transmission can then be slid back and the transmission bell housing removed to service the clutch, all without unbolting the driveshaft from either the differential or the yoke. The freeing of a transmission from a driveshaft transmission yoke utilizing the quick disconnect driveshaft transmission yoke of the present invention takes mere seconds.

4 Claims, 3 Drawing Sheets

QUICK DISCONNECT DRIVESHAFT TRANSMISSION YOKE

The present invention relates to automobile transmissions and associated driveshafts, generally, and more particularly to driveshaft transmission yokes that join transmissions to driveshafts.

BACKGROUND OF THE INVENTION

The clutches in drag racing cars are removed and serviced after each run. Presently, this typically means that the driveshaft must be unbolted from the differential so that the transmission can then be slid back to permit removal of the transmission bell housing thereby allowing access to the clutch. The reverse must be done to reassemble the car after the clutch has been serviced. This procedure is very time consuming.

SUMMARY OF THE INVENTION

The present invention provides a quick release driveshaft transmission yoke for drag racing cars that are equipped with external (male) splined output transmission shafts. The present invention provides for access to racing clutches in a fraction of the time required by the methods used in the prior art. Utilizing the quick disconnect driveshaft transmission yoke of the present invention, just a ½ turn of 4 lock nuts on a pair of split lock collars frees a splined slider from its fixed engagement with an external (male) splined output transmission shaft and allows the splined slider to slide rearward within a modified driveshaft transmission yoke. The splined slider slides rearward within the yoke until the splined slider slides free of the external (male) splined output transmission shaft. The yoke, which has also been freed from the locking engagement of the split lock collars, then drops free and clear of the external (male) splined output transmission shaft. The transmission can then be slid back and the transmission bell housing removed to service the clutch, all without unbolting the driveshaft from either the differential or the yoke. The freeing of a transmission from a driveshaft transmission yoke utilizing the quick disconnect driveshaft transmission yoke of the present invention takes mere seconds.

One embodiment of the present invention is a quick disconnect driveshaft transmission yoke, comprising a yoke with a transmission end and a U-joint end, having first involute female splines disposed through the transmission end, an alignment counterbore at the U-joint end, and a recessed step at the transmission end of the yoke; a splined slider with inner and outer surfaces, having second involute female splines on its inner surface sized to be received in close tolerance by an external male splined output transmission shaft, involute male splines on itS outer surface sized to be received in close tolerance by the first involute female splines of said yoke, and a slip fit alignment collar at its proximate end to be received in close tolerance by the alignment counterbore at the U-joint end of the first involute female splines whereby when the slip fit alignment collar is received into the alignment counterbore the yoke is held in alignment with the splined slider; and split lock collars having third involute female splines on their inner surfaces sized to receive in close tolerance the involute male splines on the outer surface of the splined slider and collar counterbores on the proximate ends of their inner surfaces sized to receive in close tolerance the recessed step in the yolk, and means to draw the split lock collars together into a quick release locking position about the splined slider and the recessed step of the yoke whereby the splined slider, yoke and split locking collars form one solid, aligned and balanced unit.

It is a principal object of the present invention to provide a quick disconnecting driveshaft transmission yoke that can be disconnected from an external (male) splined output transmission shaft in a matter of seconds.

BRIEF DESCRIPTIONS OF THE DRAWING FIGURES

DETAILED DESCRIPTION OF THE PREFERRED EMBODIMENT

Figure 1:
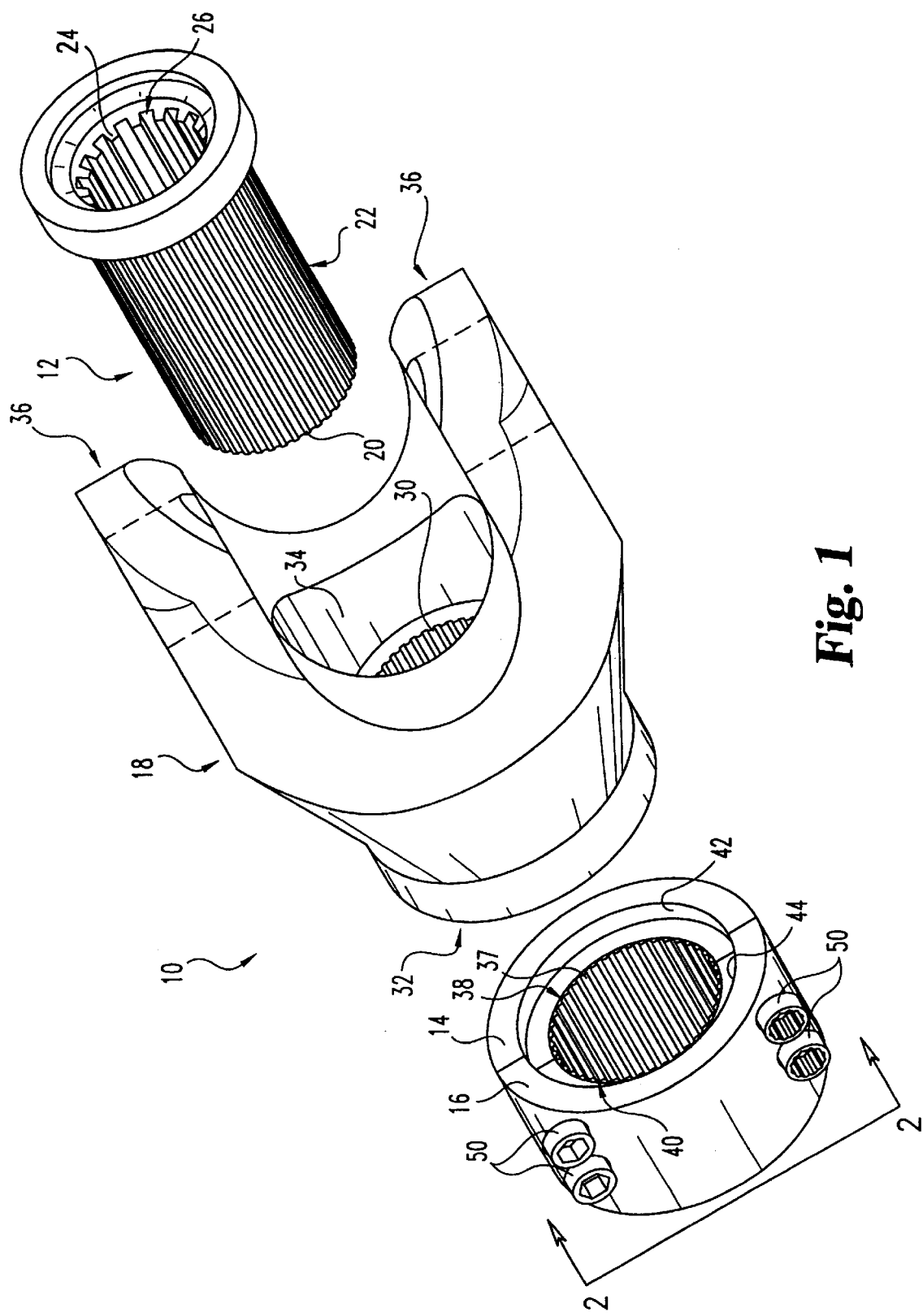
FIG. 1 is a partially exploded perspective view of the quick disconnect driveshaft transmission yoke of the present invention.

Referring now to the drawings, the quick disconnect driveshaft transmission yoke 10 of the present invention includes a splined slider 12, a pair of split lock collars 14, 16, and a yoke 18.

Splined slider 12 has involute male splines 20 on its outer surface 22, involute female splines 24 on its inner surface 26, and a slip fit alignment collar 28. The involute female splines 24 on the inner surface 26 of splined slider 12 correspond to and are sized to be slideably received, within close tolerance, by male splines on a conventional external (male) splined output transmission shaft (not shown). The tolerances are selected such that the splined slider 12 is self-centering upon the external (male) splined output transmission shaft and is driven by the external (male) splined output transmission shaft, yet may still slide on and off the external (male) splined output transmission shaft.

The involute male splines 20 on the outer surface 22 of splined slider 12 correspond to and are sized to be slideably received, within close tolerance, by corresponding involute female splines 30 provided within the transmission end 32 of yoke 18. Again, the tolerances are selected such that the splined slider 12 is self-centering within yolk 18 and drives the yolk 18 when the splined slider 12 is driven by the external (male) splined output transmission shaft. Yet, splined slider 12 freely slides in and out of the involute female splines 30 provided within yoke 18.

Yoke 18 is further provided with an alignment counterbore 34, which in the preferred embodiment to date, provides a 0.0005 inch slip fit counterbore for the slip fit alignment collar 28 of splined collar 12. When slip fit alignment collar 28 is slip fit into the alignment counterbore 34 (FIG. 3), the U-joint end 36 of yoke 18 is held in alignment with the splined slider 12 and thus with the external (male) splined output transmission shaft when splined slider 12 is slid onto the external (male) splined output transmission shaft.

Figure 3:
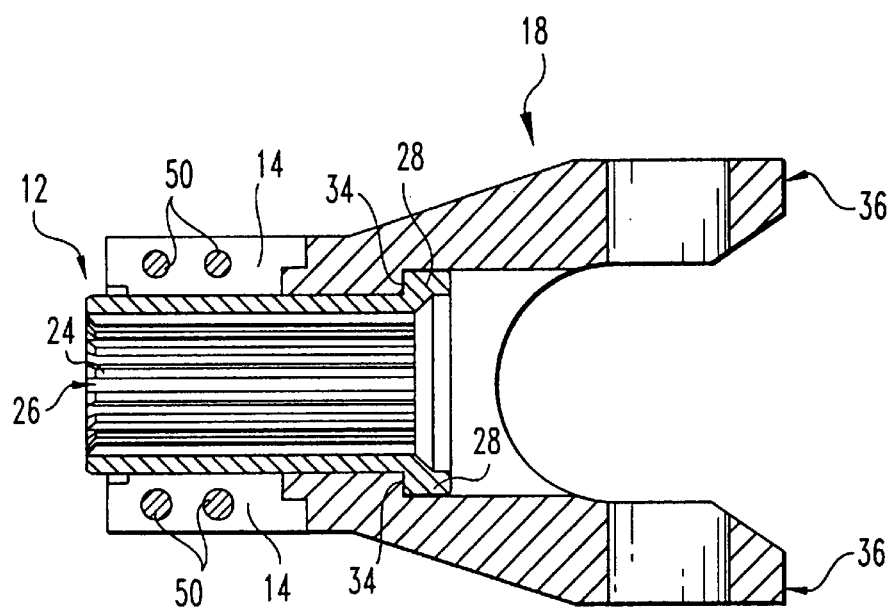
FIG. 3 is a cross sectional view of the quick disconnect driveshaft transmission yoke of FIG. 1, shown assembled, also taken along line 2—2.
Figure 4:
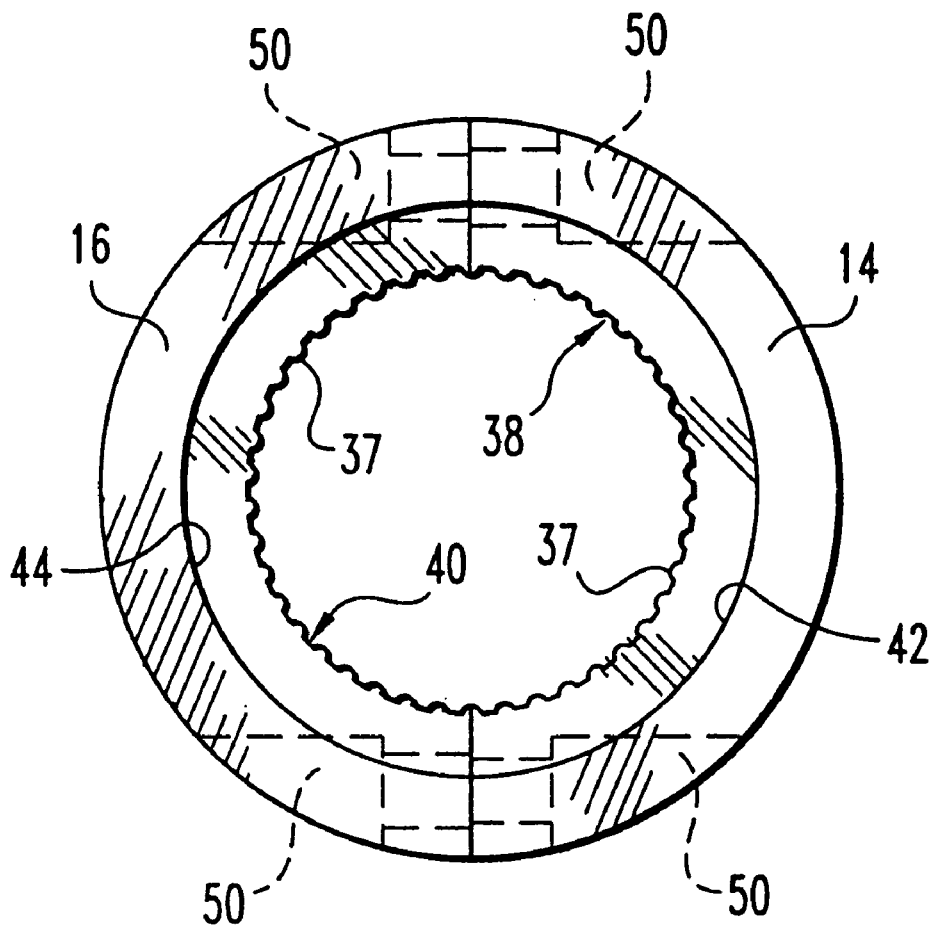
FIG. 4 is an end view of the split lock collars of FIG. 1.

Split lock collars 14, 16 also have involute female splines 37 on their inner surfaces 38, 40 that correspond to and are sized to slideably receive, in the preferred embodiment to date, in a self-centering 0.001 to 0.002 inch interference fit the involute male splines 20 on the outer surface 22 of splined slider 12. Split lock collars 14, 16 each have a collar counterbore 42, 44 sized to be received, in the preferred embodiment to date, also in a self-centering 0.001 to 0.002 inch interference fit with a corresponding recessed step 46 on the transmission end 32 of the yoke 18. Four through draw bolts 50 then enable the split lock collars 14, 16 to be drawn together and locked onto the splined slider 12 and the recessed step 46 with a self-centering 0.001 to 0.002 inch interference fit (FIG. 3). These locking steps combine to self-align and clamp together the transmission end 32 of yoke 18 and clamp the splined slider 12, so that the splined slider 12, the yoke 18 and the split lock collars 14, 16 become one solid, balanced unit when the four through bolts 50 are tightened with just a ½ turn (FIG. 3) and constitute the quick disconnect driveshaft transmission yoke of the present invention.

Figure 2:
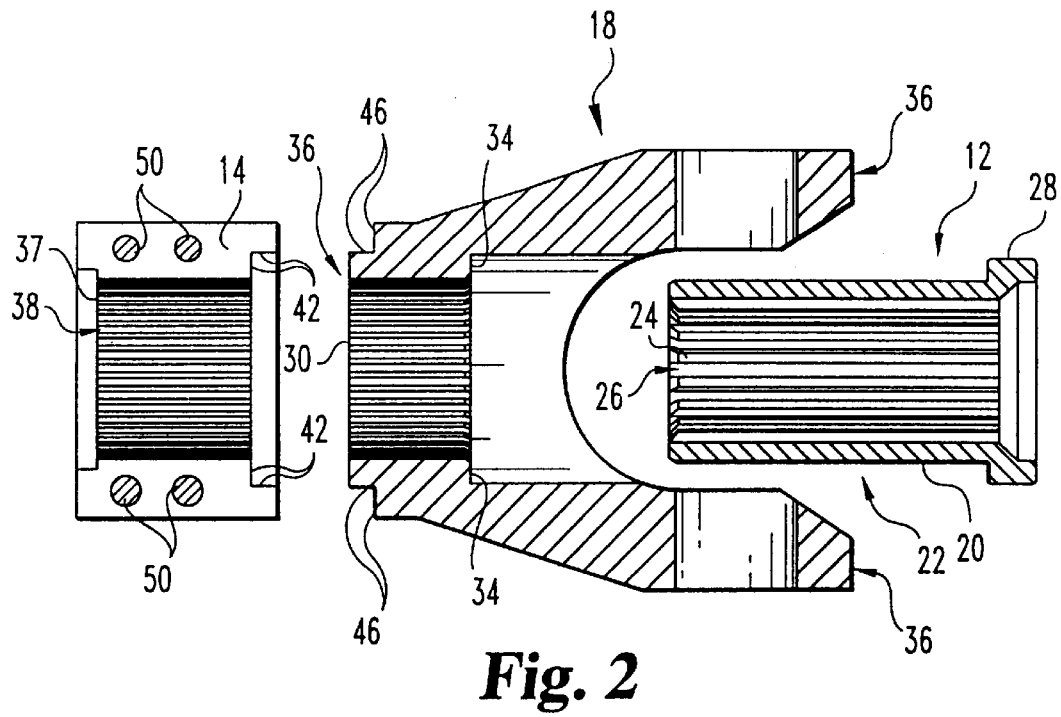
FIG. 2 is cross sectional view of FIG. 1 taken along line 2—2.

When mounted on an external (male) splined output transmission shaft, the transmission shaft will not extend into the splined slider 12 beyond the transmission end 32 of yoke 18. Therefore, when the four through bolts are loosened each ½ turn, the splined slider will be freed from its locking engagement with the split lock collars and may be slid rearwards within yoke 18 towards the u-joint end 36 of yoke 18, as illustrated in FIGS. 1 and 2. The split lock collars 12, 16 may then be slid in the opposite direction to free the interface between the split lock collars 14, 16 and the yoke 18, which will then permit the driveshaft transmission yoke 18 to drop free of the external (male) splined output transmission shaft. The transmission may then be slid rearward, free of the yoke 18 and the attached driveshaft (not shown). This can be accomplished in a matter of seconds compared with the time consuming practice of removing the driveshaft from the differential to accomplish the same end: freeing the transmission to slide rearward to provide access for service to the racing clutch before the next run.

I claim:

1. A quick disconnect driveshaft transmission yoke, comprising a yoke with a transmission end and a U-joint end, having first involute female splines disposed through the transmission end, an alignment counterbore at the U-joint end, and a recessed step at the transmission end of the yoke;

a splined slider with inner and outer surfaces, having second involute female splines on its inner surface sized to be received in close tolerance by an external male splined output transmission shaft, involute male splines on its outer surface sized to be received in close tolerance by the first involute female splines of said yoke, and a slip fit alignment collar at its proximate end to be received in close tolerance by the alignment counterbore at the U-joint end of the first involute female splines whereby when the slip fit alignment collar is received into the alignment counterbore the yoke is held in alignment with the splined slider; and split lock collars having third involute female splines on their inner surfaces sized to receive in close tolerance the involute male splines on the outer surface of the splined slider and collar counterbores on the proximate ends of their inner surfaces sized to receive in close tolerance the recessed step in the yolk, and means to draw the split lock collars together into a quick release locking position about the splined slider and the recessed step of the yoke whereby the splined slider, yoke and split locking collars form one solid, aligned and balanced unit.

2. The quick disconnect driveshaft transmission yoke of claim 1 wherein the alignment collar is received within the alignment counterbore with a 0.0005 inch slip fit.

3. The quick disconnect driveshaft transmission yoke of claim 1 wherein the split lock collars receive the involute males splines on the outer surface of the splined slider with a self-centering 0.001 to 0.002 inch interference fit.

4. The quick disconnect driveshaft transmission yoke of claim 1 wherein the split lock collars receive the recessed step in the yoke with a self-centering 0.001 to 0.002 inch interference fit.

* * * * *